US008826238B2

(12) United States Patent
Shapiro et al.

(10) Patent No.: US 8,826,238 B2
(45) Date of Patent: Sep. 2, 2014

(54) PER GROUP VERIFICATION

(75) Inventors: Adam Shapiro, Redmond, WA (US);
Conal McGarvey, Seattle, WA (US);
Vladimir A. Levin, Redmond, WA (US);
Jakob F. Lichtenberg, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1133 days.

(21) Appl. No.: 12/357,583

(22) Filed: Jan. 22, 2009

(65) Prior Publication Data
US 2010/0186003 A1 Jul. 22, 2010

(51) Int. Cl.
*G06F 9/44* (2006.01)
*G06F 9/445* (2006.01)
*G06F 11/36* (2006.01)

(52) U.S. Cl.
CPC ........ *G06F 9/44589* (2013.01); *G06F 11/3608* (2013.01); *G06F 11/3612* (2013.01)
USPC ............................. 717/126; 717/127; 717/131

(58) Field of Classification Search
CPC .................................................. G06F 9/44589
USPC ...................... 717/101–178; 706/47; 716/107; 709/203, 217; 714/1, 25, E11.163, 714/38.14, 15, E11.207; 703/21; 719/332
See application file for complete search history.

(56) References Cited

U.S. PATENT DOCUMENTS

| | | | |
|---|---|---|---|
| 5,313,616 A * | 5/1994 | Cline et al. ..................... | 717/127 |
| 5,557,740 A | 9/1996 | Johnson et al. | |
| 6,343,376 B1 * | 1/2002 | Saxe et al. ...................... | 717/154 |
| 6,594,783 B1 * | 7/2003 | Dollin et al. ................ | 714/38.14 |
| 6,618,769 B1 * | 9/2003 | Bracha et al. ................. | 719/332 |
| 6,728,914 B2 * | 4/2004 | McCauley et al. ............ | 714/726 |
| 6,886,111 B1 | 4/2005 | Tran | |
| 6,971,048 B1 | 11/2005 | Hanson et al. | |
| 6,986,132 B1 * | 1/2006 | Schwabe ....................... | 717/168 |
| 7,080,357 B2 * | 7/2006 | Foster et al. ................... | 717/126 |
| 7,089,537 B2 * | 8/2006 | Das et al. ....................... | 717/132 |
| 7,111,307 B1 | 9/2006 | Wang | |
| 7,120,902 B2 * | 10/2006 | Flanagan et al. .............. | 717/130 |
| 7,146,605 B2 * | 12/2006 | Beer et al. ..................... | 717/126 |

(Continued)

OTHER PUBLICATIONS

Modular Verification of Assembly Code with Stack-Based Control Abstractions-Xinyu Feng, Zhong Shao, Alexander Vaynberg, Sen Xiang, Zhaozhong Ni, Department of Computer Science, Department of Computer Science and Technology Yale University University of Science and Technology of China—PLDI'06 Jun. 10-16, 2006.*

(Continued)

*Primary Examiner* — Lewis A Bullock, Jr.
*Assistant Examiner* — Francisco Aponte
(74) *Attorney, Agent, or Firm* — Aaron Chatterjee; Andrew Sanders; Micky Minhas

(57) ABSTRACT

Various embodiments provide per group verification techniques in which code may be verified against one or more rules on a group by group basis. In one or more embodiments relationships between portions of a module to be verified can be defined. By being aware of relationships between various code portions, various embodiments can divide a module into related groups and perform verification on the basis of the groups. Multiple groups can be derived based at least in part upon the relationships. Each group can then be verified separately for compliance with one or more rules. Verification results can be output for each of the groups.

20 Claims, 7 Drawing Sheets

(56) References Cited

U.S. PATENT DOCUMENTS

| | | | |
|---|---|---|---|
| 7,216,338 B2* | 5/2007 | Barnett et al. | 717/126 |
| 7,231,635 B2* | 6/2007 | Schwabe | 717/126 |
| 7,287,243 B2* | 10/2007 | Dollin et al. | 717/126 |
| 7,363,618 B2* | 4/2008 | Pal et al. | 717/131 |
| 7,500,149 B2* | 3/2009 | Grieskamp et al. | 714/38.12 |
| 7,574,695 B2* | 8/2009 | Chander et al. | 717/126 |
| 7,590,520 B2* | 9/2009 | Nachmanson et al. | 703/22 |
| 7,590,973 B1* | 9/2009 | Barry et al. | 717/126 |
| 7,689,973 B2* | 3/2010 | Kwong et al. | 717/126 |
| 7,774,757 B1* | 8/2010 | Awasthi et al. | 717/127 |
| 7,926,037 B2* | 4/2011 | Leino et al. | 717/126 |
| 8,001,529 B2* | 8/2011 | Babut et al. | 717/124 |
| 8,087,005 B2* | 12/2011 | Pal et al. | 717/126 |
| 2002/0062476 A1* | 5/2002 | Saxe et al. | 717/126 |
| 2002/0083418 A1* | 6/2002 | Saxe et al. | 717/126 |
| 2002/0104067 A1* | 8/2002 | Green et al. | 717/101 |
| 2003/0097650 A1* | 5/2003 | Bahrs et al. | 717/124 |
| 2003/0226060 A1* | 12/2003 | Das et al. | 714/38 |
| 2006/0248542 A1* | 11/2006 | Wang et al. | 719/321 |
| 2007/0008892 A1* | 1/2007 | Gilfix et al. | 370/241 |
| 2007/0037521 A1* | 2/2007 | Babut et al. | 455/67.11 |
| 2007/0209032 A1* | 9/2007 | Mihai et al. | 717/126 |
| 2007/0277130 A1* | 11/2007 | Lavelle | 716/4 |
| 2008/0288834 A1* | 11/2008 | Manovit et al. | 714/718 |
| 2009/0144698 A1* | 6/2009 | Fanning et al. | 717/120 |
| 2009/0168785 A1* | 7/2009 | Glazberg et al. | 370/395.42 |
| 2009/0172649 A1* | 7/2009 | Teplitsky et al. | 717/143 |
| 2009/0319997 A1* | 12/2009 | Lichtenberg et al. | 717/126 |
| 2010/0088679 A1* | 4/2010 | Langworthy et al. | 717/126 |

OTHER PUBLICATIONS

Transforming programs to allow Static Analysis to do better—BTech Project—Computer Science and Engineering, IIT Kanpur Jun. 2005—Prof. Pankaj Jalote,Taranbir Singh, Prateek Jain, Indian Institute of Technology Kanpur.*

Post, et al., "Integrated Static Analysis for Linux Device Driver Verification", retrieved at <<http://www-sr.informatik.uni-tuebingen.de/~post/avinux/ifm2007-draft.pdf>>, pp. 1-20.

"Static Driver Verifier", retrieved at <<http://www.microsoft.com/whdc/DevTools/tools/SDV.mspx>>, Aug. 13, 2008, pp. 2.

Ball, et al., "Thorough Static Analysis of Device Drivers", retrieved at <<http://www.cs.kuleuven.be/conference/EuroSys2006/papers/p73-ball.pdf>>, EuroSys 2006, Apr. 18-21, 2006, Leuven, Belgium, pp. 73-86.

Li, et al., "A Runtime and Analysis Framework Support for Unit Component Testing in Distributed Systems", retrieved at <<http://csdl2.computer.org/persagen/DLAbsToc.jsp?resourcePath=/dl/proceedings/&toc=comp/proceedings/hicss/2007/2755/00/2755toc.xml&DOI=10.1109/HICSS.2007.31>>, 40th Annual Hawaii International Conference on System Sciences (HICSS'07), 2007, pp. 2.

* cited by examiner

PER GROUP VERIFICATION

BACKGROUND

In many code development scenarios it can be desirable to be able to verify that code adheres to rules prescribed for interaction of the code with other components. An example of such a scenario is in the context of device driver code that may be called through various operating system features (e.g., tools, functions, interfaces, services, and so forth) to cause operation of a corresponding device.

One limitation of some traditional approaches to the problem of code verification has been unreliability of results. Specifically, in some approaches, verification involves static analysis that is performed to verify compliance of a complete code project against a set of rules, such as by analyzing a device driver as a whole. However, these approaches can result in relatively high instances of non-useful results due to the size and complexity of the code and associated difficulties that may be encountered when attempting verification (e.g., resource overloading, "timing out", and so forth). Moreover, as these approaches may return a single result for a given rule, verification of code as a whole may not provide granular results as to which portion of the code may have been the cause of a non-compliant result.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide per group verification techniques in which code may be verified against one or more rules on a group by group basis. In one or more embodiments relationships between portions of a module to be verified can be defined. By being aware of relationships between various code portions, various embodiments can divide a code project into related groups and perform verification on the basis of the groups. Multiple groups can be derived based at least in part upon the relationships. Each group can then be verified separately for compliance with one or more rules. Verification results can be output for each of the groups.

DETAILED DESCRIPTION

Overview

Various embodiments provide per group verification techniques in which code may be verified against one or more rules on a group by group basis. In one or more embodiments relationships between portions of a module to be verified can be defined. By being aware of relationships between various code portions, various embodiments can divide a code project into related groups and perform verification on the basis of the groups. Multiple groups can be derived based at least in part upon the relationships. Each group can then be verified separately for compliance with one or more rules. Verification results can be output for each of the groups. Such per group verification can reduce the instances in which non-useful results are obtained and can provided greater granularity in the results.

In the discussion that follows, a section entitled "Operating Environment" describes but one environment in which the various embodiments can be employed. Following this, a section entitled "Per Group Verification Examples" describes how code verification can take place on a per group basis in accordance with one or more embodiments. Next, a section entitled "Entry Point Grouping Examples" describes examples of how groups may be derived for code verification in accordance with one or more embodiments. Last, a section entitled "Example System" is provided and describes an example system that can be used to implement one or more embodiments.

Operating Environment

Figure 1:
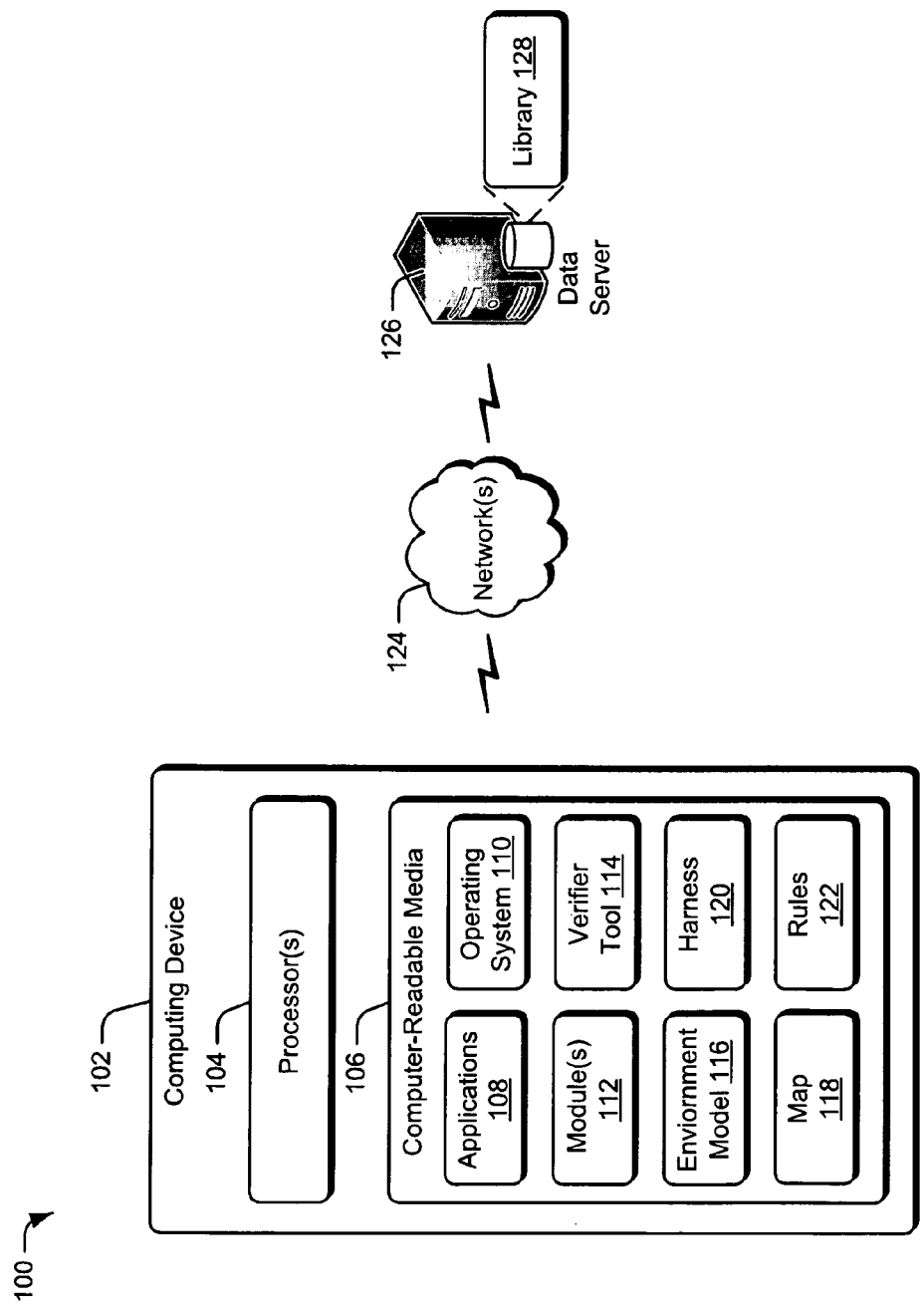
FIG. 1 illustrates an operating environment in which the inventive principles can be employed in accordance with one or more embodiments.

FIG. 1 illustrates an operating environment in accordance with one or more embodiments, generally at 100. Environment 100 includes a computing device 102 having one or more processors 104, one or more computer-readable media 106 and one or more applications 108 that reside on the computer-readable media and which are executable by the processor(s). Applications 108 can include any suitable type of application to provide a wide range of functionality to the computing device 102, including but not limited to applications for office productivity, email, media management, printing, networking, web-browsing, and a variety of other applications.

Environment 100 is also depicted as including an operating system 110 and one or more modules 112. Generally, the modules 112 represent code modules that provide interfaces between the applications 108, the operating system 110, and corresponding devices. The operating system 110 may support a variety of modules 112 to perform a variety of functions. For instance, one or more modules 112 may be configured as drivers executable on the processor 104 to facilitate operation of corresponding devices. To do so, applications 108 may call or otherwise make use of various operating system features (e.g., tools, functions, application programming interfaces (APIs), services, code libraries, and so forth) which may manipulate the drivers to cause operation of corresponding devices. A variety of devices are contemplated including but not limited to: a mass storage device; an optical disk drive; a display device; a printer; a memory card reader; a graphics card; a controller; a network interface card; an audio card; and so forth.

Environment 100 also includes a verifier tool 114 that operates as described above and below. The verifier tool 114 can operate to cause verification analysis of a subject code project (e.g., a module 112) to determine compliance with rules that may be defined for interaction of the code project with other components. In general, verifier tool 114 can perform verification of modules 112 to determine compliance with rules defined for an environment in which the code operates. Examples of module 112 include drivers, a driver stack, protocol modules, service modules, and so forth. Suitable modules 112 may be configured to include one or more entry points into the code thru which procedures of the code may be called by other components of a computing device 102. These other component can include other software modules, hardware registers, and interrupts, to name a few.

Verification analysis may involve determining that entry points into code of the modules 112 behave as intended for a particular environment, such a particular operating system, a module stack, a functional subsystem of a computing device 102, and so forth. Multiple different sequences of entry points in a code project may be called in succession and in various combinations. This creates varying pathways through the code. Verifier tool 114 can operate to determine that various combinations of entry points adhere to rules prescribed for a given environment.

By way of example and not limitation, verifier module 114 can be configured to verify various interaction of drivers with the operating system 110. While the following discussion includes examples of verification of the interaction of drivers with an operating system 110, it is to be appreciated that, in general, the described per group verification techniques may be employed to verify operation of any suitable module 112 or code project within a corresponding environment.

The operating system 110 in this case is an example of an environment in which a particular module 112 (e.g., a driver) may operate. In an embodiment, modules 112 may be configured as a series of callbacks configured to interact with operating system features. As used herein, callbacks for a module 112 represent one example of various entry points into code that may be subjected to verification analysis. Different sequences of callbacks for a particular module 112 may be executed in different situations. Accordingly, there can be a variety of different pathways through the code. Thus, verification analysis may involve determining that callbacks defined in a module 112 and/or various combinations of the callbacks behave as intended.

When performing verification of a code project, verifier tool 114 may include or otherwise make use of an environment model 116. The environment model 116 may represent a sub-set of functionality available from the corresponding environment. The environment model 116 may be used in verification to simplify analysis by reducing the sphere of interaction for the subject code project. The verifier tool 114 may also make use of a map file 118 that relates entry points in the code to functions in the environment model 116, harness files 120 to define verifications (such as designating which entry points are exercised to verify rules), and one or more rules 122 to describe intended functionality of the entry points, e.g., how interaction between entry points and other components should occur.

In the example of driver verification, the environment model 116 may be configured as an OS model to represent a sub-set of functionality available from a corresponding operating system 110. While it is possible to perform verifications using a complete operating system 110, the OS model may be employed to reduce the sphere of interaction to be verified. One way this can occur is by configuring the OS model to represent a portion of the operating system 110 with which a code project being verified is designed to interact. Thus, the OS model may represent the various procedures and interfaces (e.g., device driver interfaces DDIs) that a driver may call. The OS model may also mimic calls from the OS to the driver. For example, in the case of a printer driver, the OS model employed may represent a print subsystem of the operating system 110.

In other settings, similar environment models 116 representing an environment in which code operates can be constructed and employed. The environment model 116 may be constructed to include upper and lower layers to interact with a module 112 to be verified. These layers may structurally wrap the module 112 to be verified. The upper layer represents calls made to the code from the corresponding environment. The upper layer may also be referred to as a harness. The lower layer represents procedures of the environment that may be called from the code. These procedures may also be referred to as stubs. Thus, the environment model 116 is constructed to mimic the behavior of the environment using calls from the harness and stubs available via the lower layer. This can allow for a more controlled verification environment and can decrease the time involved in conducting verifications.

In an embodiment, a map file 118 can be configured to relate callbacks of a module to functions in the environment model 116. Typically, callbacks that are defined in a module 112 are "specialized" versions of more general functions that can be defined in libraries of the environment. The map file 118 may identify the callbacks in a module 112 and map them to corresponding functions in the environment model.

In an embodiment, a harness file 120 represents a sequence of callbacks exercised for a particular rule. The harness file 120 may be configured to define which callbacks are to be exercised by a module 112 and the sequence in which the callbacks are exercised during verification. In at least some embodiments, the harness file 120 may be configured to define or otherwise make use of groups of callbacks to cause verifier tool 114 to perform per group verification techniques as described above and below.

The rules 122 are representative of various rules that may describe how functions of the operating system 110 should be called and used. The rules 122 may also define restrictions on the use of operating system features. In other words, the rules 122 can be configured to correlate to "proper" and/or "approved" practices for interaction of code with the operating system 110. Analysis performed by verifier tool 114 can be performed to verify that code under verification (e.g., a driver or other module 112) complies with the rules 122 that have been defined for interaction with the operating system 110 or other suitable environment. Such verification techniques may be employed to identify whether any potential defects exist in the code and/or to confirm adherence to the rules 122. Further discussion of techniques that may be employed by verifier tool 114 to perform per group verification may be found in relation to the following figures.

As further illustrated in FIG. 1, computing device 102 may be connected by way of one or more networks 124 to a data server 126. Data server 126 may maintain various data that can be made available to the computing device 102 over a network 124 including, by way of example and not limitation, a library 128 as illustrated. The library 128 can be configured as a centralized database to maintain a variety of data involved in per group verification techniques described above and below. For instance, library 128 may include various modules 112 (or other suitable code projects to be verified), as well as corresponding environment models 116, map files 118, harness files 120, and rules 122 that may be used to perform verifications of the modules 112. The library 128 may be employed to facilitate automated verification of a plurality of modules 112. While illustrated as being accessible over the network 124, the library 128 or portions thereof may also be downloaded to and/or maintained locally at the computing device 102, such as being stored on computer-readable media 106.

The computer-readable media 106 can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 7.

Computing device 102 can be embodied as any suitable computing device such as, by way of example and not limitation, a desktop computer, a portable computer, a server, a handheld computer such as a personal digital assistant (PDA), cell phone, and the like.

Having considered an example operating environment, consider now per group verification examples in accordance with one or more embodiments.

Per Group Verification Examples

Figure 2:
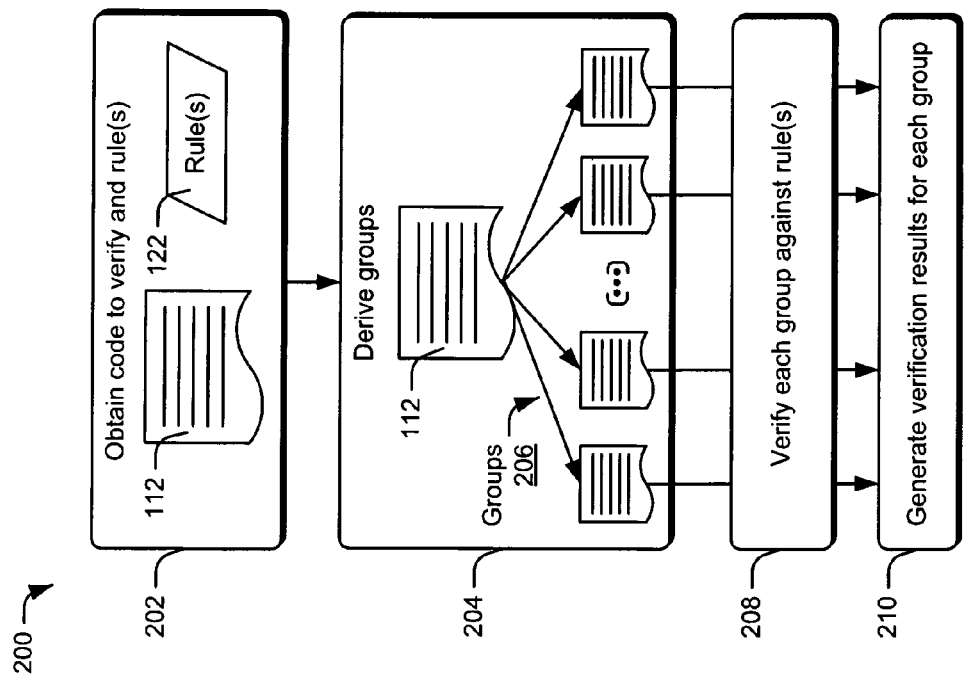
FIG. 2 is a flow diagram that describes steps in a method in accordance with one or more embodiments.

FIG. 2 illustrates example per group verification techniques in accordance with one or more embodiments generally at 200. Specifically, FIG. 2 depicts a diagram illustrating an example method in which a module 112 may be verified on a group by group basis against one or more rules 122. One way that per group verification can occur is through operation of the verifier tool 114 as described above and below. Per group verification techniques described herein with references to drivers, can also be employed to verify compliance of any suitable code project (e.g., modules 112) with rules defined for operation of the code project within a corresponding environment.

Step 202 obtains code to be verified and rules. For instance, a driver and rules 122 may be input to initiate verification by the verifier tool 114. Verifier tool 114 may be configured to obtain the driver and rules 122 from a storage location, such as from computer-readable media 106 and/or over a network from the library 128. As noted, the verifier tool 114 may also make use of an environment model 116 and a map file 118 that maps the various entry points of the code to be verified to the environment model 116.

Step 204 derives groups to perform the verification. As illustrated in FIG. 2, a driver or other module 112 may be divided into a plurality of groups 206 for the purposes of verification. Each of the groups 206 contains a portion of the code to be verified. In at least some embodiments, each group can be configured to contain one or more entry points, such as containing related callbacks associated with a driver. One way grouping for the purposes of verification can occur is by designating the various groups 206 or including data sufficient to derive the groups 206 in a harness file 120. The harness file 120 can be configured to control a sequence in which the various groups 206 are verified by the verifier tool 114. Verifier tool 114 may reference or otherwise make use of the harness file 120 to derive groups to use when verifying a corresponding module 112. In general, groups 206 may be defined according to various relationships between portions of a driver or other module being verified. A variety of suitable relationships may be employed to derive the groups 206, further discussion of which may be found in relation to the figures below.

Step 208 verifies each group against one or more rules. For instance, by way of the harness file 120, each group 206 may be submitted to the verifier tool 114, which in turn can perform an individual verification upon each of the groups 206. As noted, the verification can occur using an environment model 116 and relative to a particular rule 122. For instance, a rule 122 can be defined that describes how locked memory is to be released. Thus, in this example the verifier tool 114 may "execute" each of the derived groups 206 using the environment model 116 and monitor to determine whether memory is released in compliance with the rule 122.

Step 210 generates verification results for each of the groups. Assume in the above example involving the memory release rule that a module to be verified is divided into seven different groups 206. These groups may correspond to different entry points into the code for the module. In this example, per group verification techniques can generate seven different results corresponding to the different groups 206. Perhaps, five groups will "pass" and two groups will "fail" when verified against the memory release rule. A developer reviewing the results will be able to understand which of the groups passed and which of the groups failed. The developer can use this information to direct development and troubleshooting efforts to the two groups that failed.

By way of contrast, traditional techniques operate by evaluating an entire module 112 as a single unit. Thus, these traditional techniques are limited to providing a single overall result, e.g. "pass" or "fail" for the module 112 as a whole. Moreover, particularly when analyzing large modules, it can be more likely that the traditional techniques may "time out" or give non-useful results due to the added complexity. For instance, when analyzing a driver as a whole, one portion of the driver that does not comply with the rule 122 or cannot be successfully analyzed can "block" the analysis from continuing to other portions. In the preceding example, an overall result of "failed" would be returned using the traditional techniques, even though five out of seven portions of the code could comply with the memory release rule 122 if analyzed individually. Further, it may be time consuming, difficult, or even impossible for a developer to determine the particular portion within the driver that caused the "failed" result.

Accordingly, in comparison to traditional techniques, per group verification described herein can reduce the instances in which non-useful results are obtained and can provided greater granularity in the results. In turn, this may enable more efficient verification and allow resources to be more effectively allocated to troubleshoot specific portions of a code project that fail to comply with a given rule 122.

Figure 3:
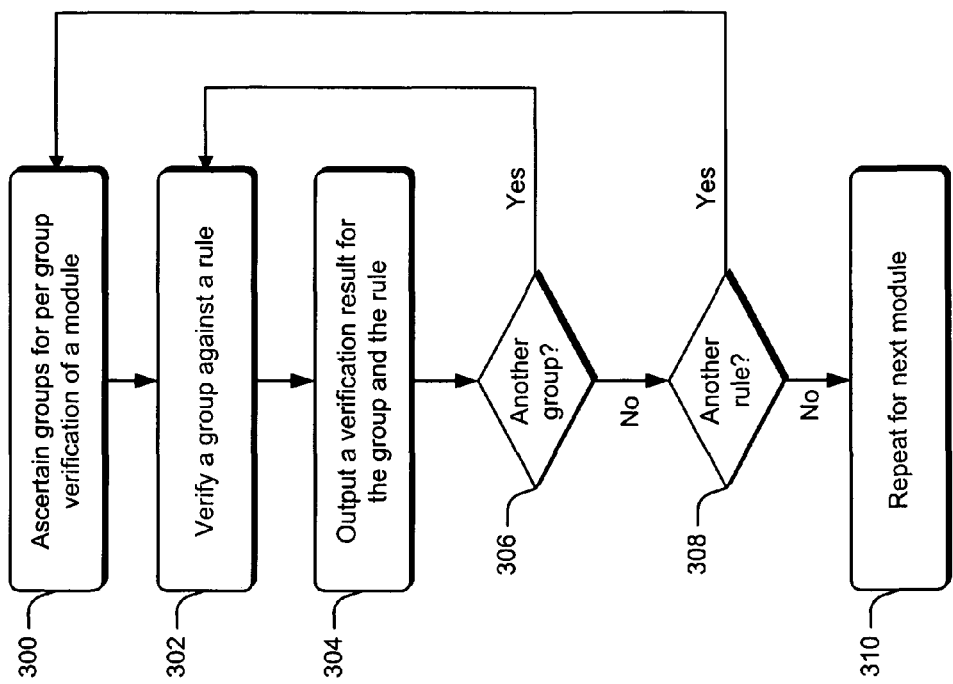
FIG. 3 is a flow diagram that describes steps in a method in accordance with one or more embodiments.

FIG. 3 is a flow diagram that describes steps in a method in accordance with one or more embodiments. The method can be implemented in connection with any suitable hardware, software, firmware or combination thereof. In at least some embodiments, the method can be implemented by a suitably-configured verifier tool, such as the one described above.

Step 300 ascertains groups for per group verification of a module. For instance verifier tool 114 may be configured to ascertain various groups 206 corresponding to a driver to be verified and can make use of groups to perform verification of the driver on a group by group basis. One way this can occur is with the aid of a harness file 120 that describes the groups 206. In at least some embodiments, a harness file 120 can describe the groups using a language that enables the verifier tool 114 to derive the groups for the purposes of verification. Additionally or alternatively, the harness file 120 can designate particular groups 206 that can be identified and used by the verifier tool 114.

A variety of techniques can be employed to define groups suitable for per group verifications. As noted previously, groups can be based at least in part upon relationships between entry points, such as callbacks within a driver or other module. Specifically, groups may be configured to include entry points, or callbacks, that are related one to another in some manner. The harness file 120 can be configured to describe relationships between various entry points and/or to describe the corresponding groups based on the relationships.

In at least some embodiments, the relationships between entry points and/or callbacks can be based upon common functionalities. For instance, callbacks of a driver that relate to a particular memory operation can be formed into a group. Another group may be formed to have callbacks that relate to adding of a device object. Yet another group can be arranged to include callbacks that interact with a graphics subsystem of the operating system, such as to draw a user interface. A variety of other examples of functionality based groups are also contemplated.

Additionally or alternatively, entry points and/or callbacks may be grouped according to interdependencies and/or common parameter use. By way of example and not limitation, callbacks that utilize a common initialization value or state can be arranged into a group. Likewise, interdependent callbacks that rely upon parameter values being passed one to another, call each other, or are otherwise interdependent can be formed into groups.

Yet another way groups can be defined is according to identified pathways (e.g., sequences of callbacks) through the code to be verified. In an implementation, pathways may be formed at least in part based upon one or more non-deterministic choices or branches in the code. In this instance, groups may be defined to correspond to each pathway that can occur into and out of the one or more non-deterministic choices. Further discussion of grouping techniques suitable to enable per group verification by the verifier tool 114 can be found in the section below entitled "Entry Point Grouping Examples".

Step 302 verifies a group against a rule. As noted previously, verifier tool 114 may make use of an OS model, a map file 118, and a harness file 120 to verify a driver against one or more rules 122. The verification can occur group by group in accordance with groups formed as described above and below. Each group can be verified individually against a particular rule 122. In at least some embodiments, a harness file 120 defines groupings of callbacks (e.g., entry points) as noted above relative to a particular rule 122. Thus, a different harness file 120 can be configured to define groupings for each rule 122 against which a driver is to be verified. In other words, the groupings can be different for different rules. This can be the case because the relationships between callbacks described above can change depending upon the particular rule being verified.

Accordingly, verifier tool 114 can be configured to cycle through each group to verify the groups against a particular rule 122. Moreover, verifier tool 114 can operate to ascertain different groups for different rules 122. Even further, the verifier tool 114 can automatically cycle through multiple modules 112 to verify each module 112 against one or more rules 122. Each module 112 can be grouped for each rule 122 and verified on a per group basis as described herein.

A variety of rules 122 suitable to describe intended behavior of modules, such as drivers, are contemplated. By way of example and not limitation rules may be defined to describe: how memory is reserved and/or released; how devices are added or removed; use of memory handles; communication protocols; buffering; process creation and/or destruction; proper file operations; naming conventions; synchronization; interrupt handling; error handling; and so forth.

For instance, following verification of a particular group against a particular rule in step 302, step 304 outputs a verification result for the group and rule. One way this can occur is by generating and/or updating a results log that can be stored on computer-readable medium 106. Additionally or alternatively, results can be communicated over a network 124 to a network storage location, such as for storage in the library 128.

Step 306 makes a determination as to whether another group is to be verified against the rule. So long as it is determined that additional groups are to be verified against the rule, the verification of step 302 and output a result of step 304 can be repeated for each of the groups.

When each group has been analyzed against the particular rule, step 308 determines whether the module is be verified against another rule. If so, the method returns to step 300 and is processed as described above. As noted above, groups can be defined differently for different rules. However, in some cases multiple different rules may use the same groups and/or same corresponding harness file 120 to describe the groups. This can be the case for example when different rules are closely related. Thus, the groups ascertained for the next rule can be the same groups or different groups. When groups for the next rule have been ascertained, the verification of steps 302 and 304 and the determination of step 306 can be repeated for each of the groups relative to the next rule. When each group has been verified against the next rule, step 308 can again determine whether the module is to be verified against another rule. The cycle just described can then be repeated so long as it is determined in step 308 that the module is to be verified against another rule.

When the code project has been verified against each rule, step 310 proceeds to repeat the verification of steps 302-308 as just described for the next module. The verification can be repeated for each module so long as there is additional code to be verified. In this manner, a verifier tool 114 can be configured to automatically perform per group verification for each of a plurality of modules 112.

Having described example embodiments in which verification can occur on a per group basis, consider now other embodiments in which groups for use in per group verification can be defined. Specifically, in the embodiments described just below, examples of grouping entry points are described to provide tangible examples for the benefit of the reader of groups that may be employed with one or more embodiments of per group verification techniques described herein.

Entry Point Grouping Examples

Figure 4:
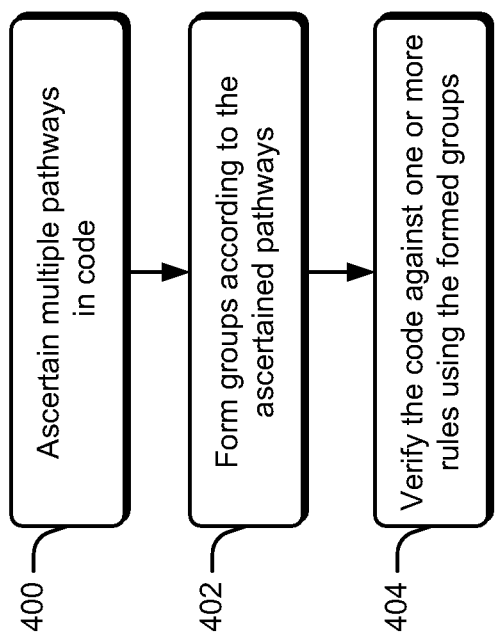
FIG. 4 is a flow diagram that describes steps in a method in accordance with one or more embodiments.

FIG. 4 is a flow diagram that describes steps in a method in accordance with one or more embodiments. The method can be implemented in connection with any suitable hardware, software, firmware or combination thereof. In at least some embodiments, the method can be implemented using a suitably-configured verifier tool that makes use of a harness file, such as the one described above.

Step 400 ascertains multiple pathways in code to be verified. The multiple pathways can be ascertained in any suitable way. For instance, multiple pathways in a module 112 may be formed based upon entry points into the code. By way of example, device drivers may be configured as a series of callbacks that enable interaction with operating system features. The callbacks can represent various entry points into the code for a driver. In at least some embodiments, a harness file 120 can be configured to describe relationships between callbacks within a driver. Verifier tool 114 can operate to reference the harness file 120 to understand the relationships between the callbacks described therein. The relationships described in the harness file can be used to derive different possible sequences of callbacks through a driver that may be executed in different situations. Specifically, the relationships described in the harness file 120 are sufficient to identify different possible pathways that can occur and to derive groups based on the pathways for the purposes of per group verification.

Step 402 forms groups according to the ascertained pathways. In the above example, verifier tool 114 can form groups based upon the multiple different pathways through the driver code. The verifier tool 114 can configure groups to correspond to the different identified pathways (e.g. sequences of callbacks). When suitable groups have been formed, step 404 verifies the code against one or more rules using the formed groups. This can occur in accordance with per group verification examples discussed previously, one example of which is the method described above with respect to FIG. 3.

As noted, verifier tool 114 can make use of several components that coordinate the verification process and can adapt analysis for drivers written using various driver models. It is noted that drivers can be written according to a variety of driver models including but not limited to: a windows driver model (WDM), a kernel mode driver framework (KMDF), and a network driver interface specification (NDIS), to name just a few. The components as described above can include the device driver source code and an OS model that represents the functions and libraries that the source code can call. It is noted that the OS model can be configured according to the driver model used to write a particular driver.

As previously described, the components employed by verifier tool 114 can also include a map file 118 that identifies the callbacks that are supported by a driver. Map file 118 can be configured in a variety of ways to relate functions defined in a module 112 to general functions defined in the operating system 110 or an environment model 116 based on the operating system. One example of a suitable format for a map file is as follows:

```
//Approved=true
#define fun_Callback1 Function1
#define fun_Callback2 Function2
#define fun_Callback3 Function3
#define fun_Callback4 Function4
#define fun_Callback5 Function5
#define fun_Callback6 Function6
```

In the above example format, the map file is configured to map the "Callbacks" 1-6 of an operating system model to corresponding "Functions" 1-6 of a driver. In other examples, a map file may be configured to map functions in any suitable environment model 116 to entry points of corresponding code to be verified.

Along with the source code, environment model 116, and map file 118, the verifier tool 114 can also make use of a harness file 120 that represents one or more groups of callbacks to be verified for a module 112. The harness file 120 can be configured in any suitable way to define groups of callbacks according to various relationships described above and below. Verifier tool 114 may make use of a suitably configured harness file 120 to understand the groups and perform per group verifications for a module 112. Consider now a few examples of suitably configured harness files 120 that can be employed to implement callback grouping for a driver. Note that similar grouping techniques may generally be employed with other types of modules 112 and/or entry points.

A harness file can represent a set of callbacks to be exercised for a driver for the purposes of verification. Multiple pathways though a driver code can be determined by understanding where non-deterministic choices can be made in the driver code. Non-deterministic choices represent code execution choices or branches that may occur in the alternative. The harness file can be configured to reflect the structure of the callbacks in the corresponding driver including identification of the non-deterministic choices. The verifier tool 114, when presented with structure of the callbacks from the harness, can identify the multiple pathways for exercising a driver, derive corresponding groups, and perform verification individually for each of the pathways based on the groups.

One way in which a harness file can be configured to reflect the structure of the callbacks in the corresponding driver is by employing a language to categorize the callbacks. Any categorization suitable to enable the structure of the callbacks to be derived and/or groups of callbacks to be formed may be employed. Specifically, the harness file can be coded with metadata to categorize callbacks. In one example, the language can be configured to categorize callback functionally. In this example, functional groups of callbacks can be derived according to the functional categorizations in a harness file. In another example, the language can be configured to differentiate between callbacks that execute responsive to a non-deterministic choice and other callbacks in a driver. This can enable verifier tool 114 to construct the various pathways through driver code and perform verification accordingly.

In one embodiment, a language may be defined to designate callbacks as "Pre", "Core", or "Post" callbacks. In general, "Pre" callbacks relate to initialization operations of a module, such as setting initialization parameters, reserving memory, and so forth. "Pre" callbacks can occur before a non-deterministic choice. "Core" callbacks relate to core functionality of a module and generally occur following a non-deterministic choice. Accordingly, the "Core" callbacks may be considered as forming a non-deterministic portion of the module 112. Multiple non-deterministic choices may occur in the non-deterministic portion, which can lead to a multiplicity of possible pathways through the module code. "Post" callbacks relate in general to clean-up operations of the module code that can occur after the non-deterministic portion of a module, such as releasing memory, clearing parameter values, and so forth. The "Pre", "Core" or "Post" designation represent one example technique that may be employed to designate positions of callbacks within a module relative to a non-deterministic portion of the module. These designations, or other suitable categorization metadata, can enable the structure of the module to be derived, such as by a suitably configured verifier tool.

To further illustrate, specific examples of callback groupings and corresponding harness files that may be employed in one or more embodiments are described just below with reference to FIGS. 5 and 6.

Figure 5:
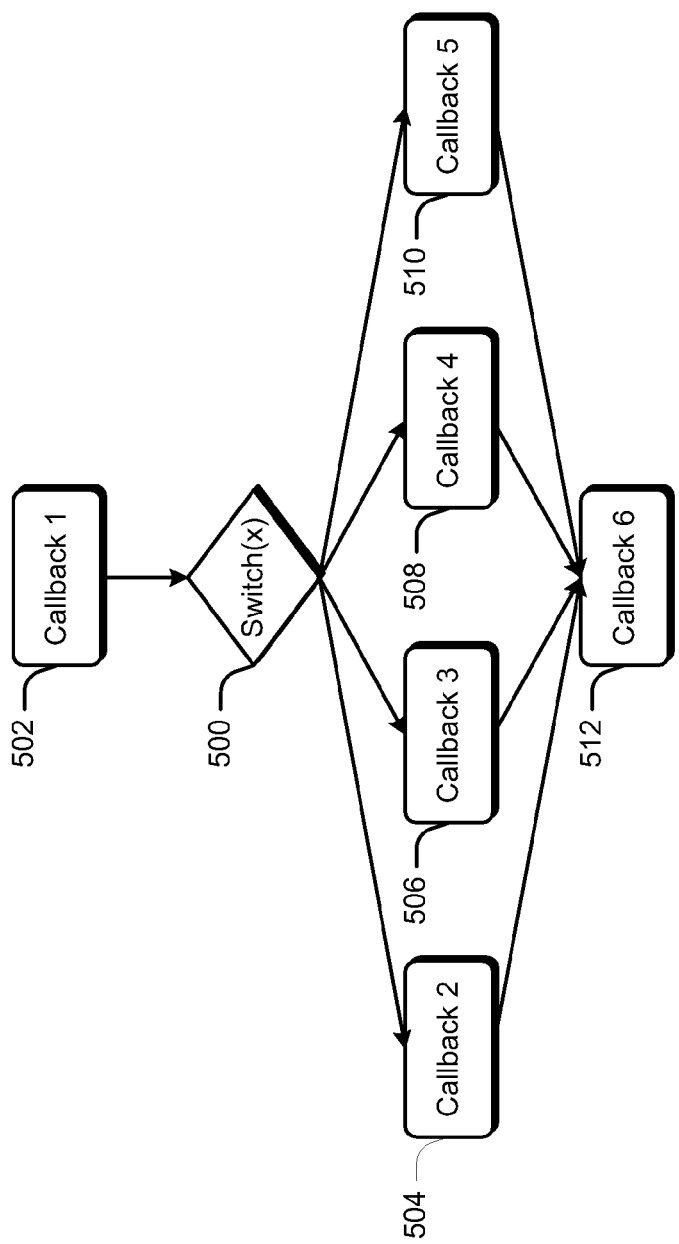
FIG. 5 illustrates an example callback structure in accordance with one or more embodiments.

FIG. 5 is a diagram illustrating an example callback structure in accordance with one or more embodiments. The callback structure may be representative of multiple pathways through code for a driver that may be the subject of verification. In particular, the callback structure of FIG. 5 includes one non-deterministic choice 500 designated by the function "Switch(x)". The diagram also includes multiple callbacks 502 to 512.

A harness file 120 can be configured to reflect the structure illustrated in the diagram of FIG. 5. One way this can occur is by using the "Pre", "Core" and "Post" designations described above. Specifically, the "Callback 1" 502 can be designated as "Pre"; "Callback 2-Callback 5" 504-510 can be designated as "Core" and "Callback 6" 512 can be designated as "Post". One example of a format suitable to implement a harness file corresponding to the structure of FIG. 5 is as follows:

```
SDV_HARNESS_PNP_IO_REQUESTS
//define DriverEntry pre_callback_#1
/*define fun_WDF_DRIVER_DEVICE_ADD pre_callback_#1
define fun_WDF_IO_QUEUE_IO_DEFAULT core_callback
define fun_WDF_IO_QUEUE_IO_READ core_callback
define fun_WDF_IO_QUEUE_IO_WRITE core_callback
define fun_WDF_IO_QUEUE_IO_DEVICE_CONTROL
core_callback
define fun_WDF_REQUEST_CANCEL_1 post_callback_#1
*/
```

The harness file 120 in this example may be considered a "shaped" harness. A "shaped" harness can be configured to call the driver repeatedly. The harness file can also describe an implicit sequence in which the callbacks are to be executed. In general, there can be some callbacks that are optional and some callbacks that are executed for each pathway through a driver. A "shaped" harness can designate one or more "Pre" callbacks, followed by a non-deterministic choice of "Core" callbacks (e.g. a non-deterministic portion of the driver), followed by zero or more "Post" callbacks.

Using the above example of a harness and the designations of callbacks therein, the verifier tool 114 can determine the structure illustrated in FIG. 5 and derive groups that correspond to the multiple possible pathways through the driver. Specifically, four groups of callbacks can be formed as follows:

```
Group1={CALLBACK1, CALLBACK2, CALLBACK6}
Group2={CALLBACK1, CALLBACK3, CALLBACK6}
Group3={CALLBACK1, CALLBACK4, CALLBACK6}
Group4={CALLBACK1, CALLBACK5, CALLBACK6}
4 groups = 1(pre)*4(core)*1(post)
```

Using traditional techniques, a verification analysis engine would proceed by evaluating all the functions contained in a driver as a single unit. With per group verification, however, the verifier tool 114 can evaluate each of the groups of callbacks described above as separate units of verification. The harness can define the order that callbacks are typically executed, and define the possible combinations of callbacks, for example by using the "Pre", "Core" and "Post" designation or other suitable categorization metadata. By defining possible combinations of callbacks that represent sequences of related calls, performance can be improved by enabling input of each group for verification separately.

It is possible to define multiple callbacks in each of the "Pre", "Core", and "Post" callback groups. Consider now the example of FIG. 6 which depicts a diagram illustrating another example callback structure in accordance with one or more embodiments. In particular, the callback structure of FIG. 6 includes one non-deterministic choice 600 designated by the function "Switch(x)". The diagram also includes multiple callbacks 602 to 616.

Figure 6:
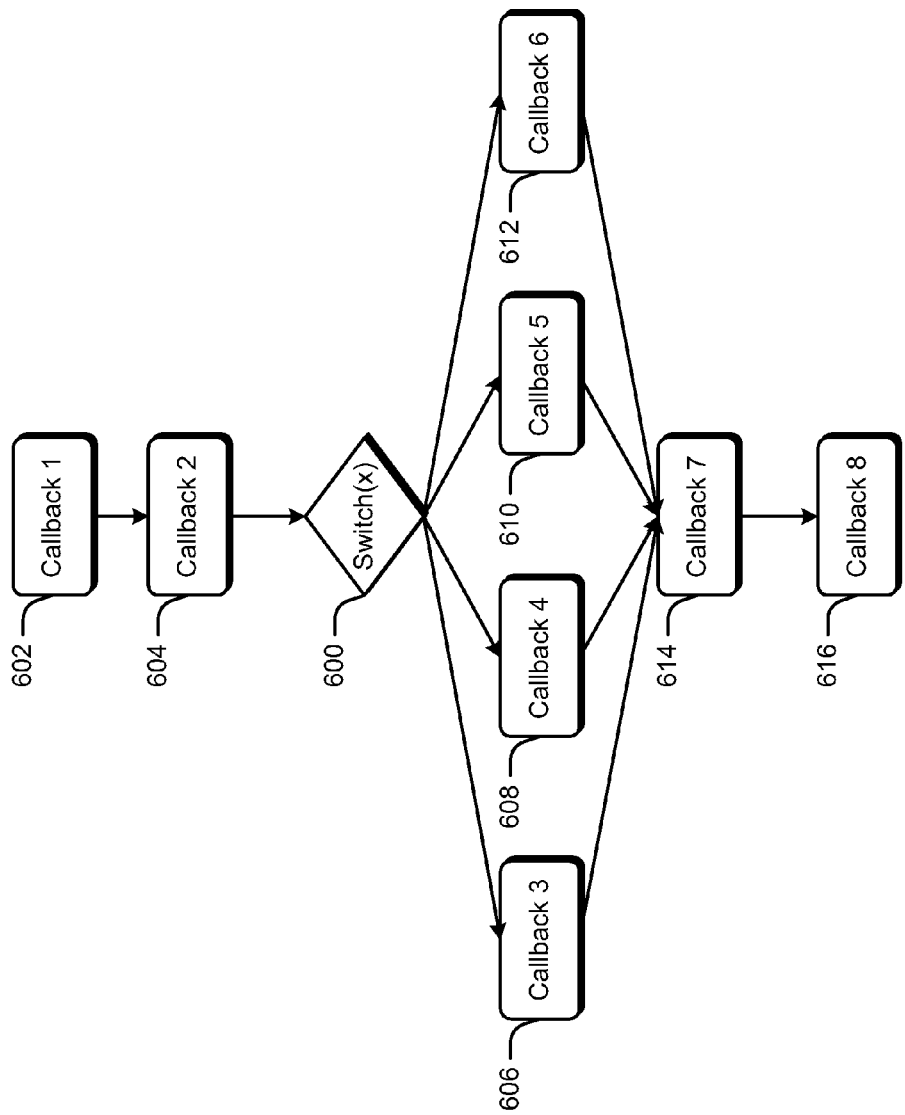
FIG. 6 illustrates an example callback structure in accordance with one or more embodiments.

In the example of FIG. 6 there are two "Pre" callbacks 602, 604 and two "Post" callbacks 614, 616. The callbacks 606-612 are "Core" callbacks.

In this case, a corresponding map file 118 can be configured to have following entry points and relationships to map the callbacks to the driver functions:

```
//Approved=true
#define fun_Callback1 Function1 //pre #1
#define fun_Callback2 Function2 //pre #2
#define fun_Callback3 Function3 //core
#define fun_Callback4 Function4 //core
```

-continued

```
#define fun_Callback5 Function5 //core
#define fun_Callback6 Function6 //core
#define fun_Callback7 Function7 //post #1
#define fun_Callback8 Function8 //post #2
```

It is noted that in the preceding example, the map file 118 includes annotations that describe the "Pre", "Core", and "Post" designations of the callbacks. These annotations can provide another mechanism by which the structure of a driver can be communicated for use by the verifier tool 114.

Continuing the example of FIG. 6, the harness file can be configured to define the two "Pre" callbacks, four "Core" callbacks, and two "Post" callbacks. One example of a format of code suitable to implement a harness file corresponding to the structure of FIG. 6 is as follows:

```
SDV_HARNESS_PNP_IO_REQUESTS
//define DriverEntry pre_callback_#1
/*define fun_WDF_DRIVER_DEVICE_ADD pre_callback_#1
define fun_WDF_DEVICE_SELF_MANAGED_IO_INIT
pre_callback_#2
define fun_WDF_IO_QUEUE_IO_DEFAULT core_callback
define fun_WDF_IO_QUEUE_IO_READ core_callback
define fun_WDF_IO_QUEUE_IO_WRITE core_callback
define fun_WDF_IO_QUEUE_IO_DEVICE_CONTROL
core_callback
define fun_WDF_IO_QUEUE_IO_INTERNAL_DEVICE_CONTROL
core_callback
define fun_WDF_REQUEST_CANCEL_1 post_callback_#1
define fun_WDF_REQUEST_CANCEL_2 post_callback_#2
*/
```

Using the above harness corresponding to the structure of FIG. 6, verifier tool 114 would separately verify sixteen groups of callbacks to obtain sixteen different results. Specifically, the sixteen groups of callbacks can be formed as follows:

```
Group1={CALLBACK1, CALLBACK3, CALLBACK7}
Group2={CALLBACK1, CALLBACK4, CALLBACK7}
Group3={CALLBACK1, CALLBACK5, CALLBACK7}
Group4={CALLBACK1, CALLBACK6, CALLBACK7}
Group5={CALLBACK1, CALLBACK3, CALLBACK8}
Group6={CALLBACK1, CALLBACK4, CALLBACK8}
Group7={CALLBACK1, CALLBACK5, CALLBACK8}
Group8={CALLBACK1, CALLBACK6, CALLBACK8}
Group9={CALLBACK2, CALLBACK3, CALLBACK7}
Group10={CALLBACK2, CALLBACK4, CALLBACK7}
Group11={CALLBACK2, CALLBACK5, CALLBACK7}
Group12={CALLBACK2, CALLBACK6, CALLBACK7}
Group13={CALLBACK2, CALLBACK3, CALLBACK8}
Group14={CALLBACK2, CALLBACK4, CALLBACK8}
Group15={CALLBACK2, CALLBACK5, CALLBACK8}
Group16={CALLBACK2, CALLBACK6, CALLBACK8}
16 groups = 2(pre)*4(core)*2(post)
```

In accordance with per group verification strategy, each of the foregoing groups can be derived using the harness and can then be verified separately.

It is to be noted that in some instances the callbacks within a driver may not have interdependency for a particular rule. In this case a "flat" harness may be defined to verify the driver against the rule. The "flat" harness will call each of the callbacks that are implemented by a driver once. This can involve multiple analysis passes, such that each callback is verified independently from the other callbacks. One example of a suitably configured flat harness that may be employed in one or more embodiments is as follows:

```
SDV_WDF_FLAT_HARNESS
  define fun_WDF_DEVICE_CONTEXT_CLEANUP core_callback
  define fun_WDF_DEVICE_CONTEXT_DESTROY core_callback
  define
  fun_WDF_IO_QUEUE_CONTEXT_CLEANUP_CALLBACK
core_callback
  define fun_WDF_IO_QUEUE_CONTEXT_DESTROY_CALLBACK
core_callback
  define fun_WDF_FILE_CONTEXT_CLEANUP_CALLBACK
core_callback
  define fun_WDF_FILE_CONTEXT_DESTROY_CALLBACK
core_callback
  define fun_WDF_CHILD_LIST_CREATE_DEVICE core_callback
  define fun_WDF_CHILD_LIST_SCAN_FOR_CHILDREN
  core_callback
```

In this example, notice that each callback is defined in the harness to be called once within a non-deterministic structure. In traditional techniques, verification analysis would evaluate all the functions in the harness as a single unit. With per group verification, verifier tool 114 can be configured to evaluate each of the functions in the "flat" harness separately.

In at least some embodiments, a header of the harness file 120 can be employed to define groupings and/or communicate the groupings or data sufficient to derive the grouping to the verifier tool 114. One way this can occur is by including metadata in the header that includes the designations to categorize callbacks within a corresponding driver as previously described. For example, a header can be configured to employ the "Pre", "Core", "Post" designations or other suitable categorization metadata. Verifier tool 114 can operate to reference the header to understand the groupings defined therein, and can perform per group verifications accordingly.

The harness header can be configured to designate multiple "Pre", "Core", "Post" callback groupings. One example of a header corresponding to the structure that is illustrated in FIG. 6 can be formatted as follows:

```
// Harness MetaData file for Harness
// This metadata file can be employed to process rules that use this
Harness.
/*define fun_Callback1 pre_callback_#1
//define fun_Callback2 pre_callback_#2
//define fun_Callback3 core_callback
//define fun_Callback4 core_callback
//define fun_Callback5 core_callback
//define fun_Callback6 core_callback
//define fun_Callback7 post_callback_#1
//define fun_Callback8 post_callback_#2
*/
```

Having described example techniques to perform verifications on a group by group basis, as well as example techniques to derive groups for per group verifications, consider now an example system that can be utilized to implement the embodiments described above.

Example System

Figure 7:
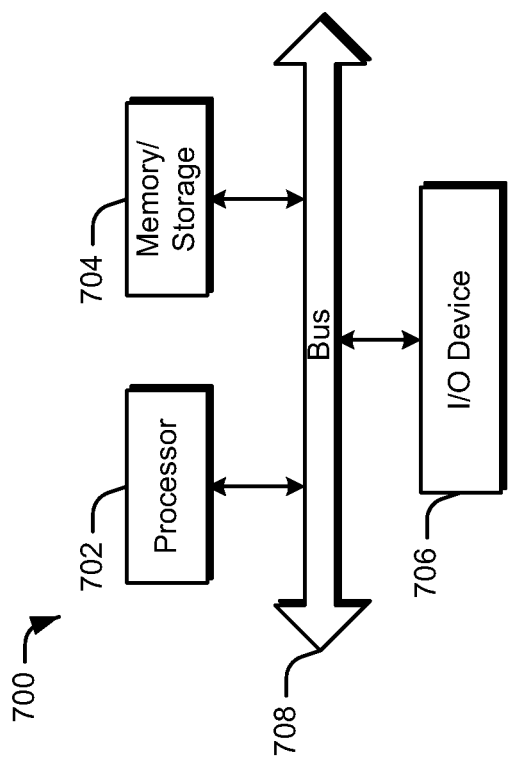
FIG. 7 is a block diagram of a system that can implement the various embodiments

FIG. 7 illustrates an example computing device 700 that can implement the various embodiments described above. Computing device 700 can be, for example, computing device 102 of FIG. 1 or any other suitable computing device.

Computing device 700 includes one or more processors or processing units 702, one or more memory and/or storage components 704, one or more input/output (I/O) devices 706, and a bus 708 that allows the various components and devices to communicate with one another. Bus 708 represents one or more of any of several types of bus structures, including a memory bus or memory controller, a peripheral bus, an accelerated graphics port, and a processor or local bus using any of a variety of bus architectures. Bus 708 can include wired and/or wireless buses.

Memory/storage component 704 represents one or more computer storage media. Component 704 can include volatile media (such as random access memory (RAM)) and/or non-volatile media (such as read only memory (ROM), Flash memory, optical disks, magnetic disks, and so forth). Component 704 can include fixed media (e.g., RAM, ROM, a fixed hard drive, etc.) as well as removable media (e.g., a Flash memory drive, a removable hard drive, an optical disk, and so forth).

One or more input/output devices 706 allow a user to enter commands and information to computing device 700, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments described above provide per group verification techniques in which code may be verified against one or more rules on a group by group basis. In one or more embodiments relationships between portions of a module to be verified can be defined. By being aware of relationships between various code portions, various embodiments can divide a module into related groups and perform verification on the basis of the groups. Multiple groups can be derived based at least in part upon the relationships. Each group can then be verified separately for compliance with one or more rules. Verification results can be output for each of the groups. Such per group verification can reduce the instances in which non-useful results are obtained and can provided greater granularity in the results.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
ascertaining multiple pathways in code to be verified by referencing a harness file that designates a position of callbacks within the code relative to a non-deterministic portion of the code defined by one or more non-deterministic choices, harness designations being sufficient to identify the multiple pathways;
forming groups for verification of the code according to identified pathways, each of the groups containing a portion of the code to be verified; and
directly verifying the code against one or more rules using the formed groups, including:
for a first rule:
executing respective pathways in the code corresponding to each of the groups; and
monitoring to determine compliance of the respective pathways with the first rule; and
when the code is verified against multiple rules, for each other said rule:
executing the respective pathways in the code corresponding to each of the groups; and
monitoring to determine compliance of the respective pathways with the other said rule.

2. The method of claim 1, wherein the rules are defined for interaction of the code with an environment in which the code operates.

3. The method of claim 1, wherein the harness file that describes relationships between multiple entry points within the code.

4. The method of claim 1, further comprising outputting a different verification result for each of the formed groups.

5. The method of claim 1, wherein the code corresponds to a driver.

6. The method of claim 1, wherein:
callbacks occurring before the non-deterministic portion are designated as "Pre" and relate to initialization operations of the code;
callbacks occurring in the non-deterministic portion are designated as "Core" and relate to core functionality of the code; and
callbacks occurring after the non-deterministic portion are designated as "Post" and relate to clean-up operations of the code.

7. A computer-readable storage device storing computer readable instructions to implement a harness file configured to:
describe relationships between entry points within code of a module corresponding to the harness file, the relationships described by designating a position of the entry points relative to a non-deterministic portion of the code of the module defined by one or more non-deterministic choices;
enable a verifier tool, referencing the harness file to verify the code of the module against a single rule, to form groups of the code that are associated with the entry points according to the described relationships, the verifier tool configured to verify the code of the module against multiple rules by referencing multiple harness files, each configured to enable the verifier tool to verify the code of the module on a per group basis against a respective said rule;
verify compliance of the code of the module with a single rule by directly verifying compliance of each of the formed groups of the code with the single rule separately such that each of the formed groups of the code is individually verified with the single rule in a sequence indicated by the harness file; and
generate verification results that indicate whether each of the formed groups of the code separately complies with the single rule.

8. The computer-readable storage device of claim 7, wherein the described relationships reflect the structure of the entry points within the code of the module.

9. The computer-readable storage device of claim 7, wherein the described relationships categorize the entry points within the code of the module according to functionality.

10. A system comprising:
one or more processors;
one or more computer-readable storage devices;
one or more modules embodied on the one or more computer-readable storage devices that are operable through interaction with an operating system to control respective devices; and
a verifier tool embodied on the one or more computer-readable storage devices and configured to:
derive groups of code containing code of at least one module using harness files that define the groups of code for multiple rules such that a different harness file is configured to define the groups of code for each of the multiple rules, at least one of the harness files defining the groups of code differently than another harness file, use of the harness files involving making reference to the harness files that are configured to represent a structure of the code of the at least one module by categorizing multiple callbacks within the code of the at least one module according to a relationship of the multiple callbacks to a non-deterministic portion of the code of the at least one module; and
directly verify compliance of the code of the at least one module with the multiple rules that are defined for interaction of the code of the at least one module with the operating system on a per group basis, including:
verify compliance of the code on a per group basis with a first of the multiple rules; and
until compliance with each of the multiple rules is verified, verify compliance of the code on a per group basis with one of the multiple rules for which compliance remains to be verified.

11. The system of claim 10, wherein the verifier tool is configured to employ an environment model of the operating system to verify compliance of the code of the at least one module with the multiple rules.

12. The system of claim 10, wherein the groups of code are derived to group portions of the code of the at least one module that are functionally related.

13. The system of claim 10, wherein the groups of code each comprise one or more entry points contained within the code of the at least one module.

14. The system of claim 10, wherein the harness files are configured to describe relationships between callbacks within the code of the at least one module.

15. The system of claim 10, wherein the verifier tool is configured to derive groups of code by:
ascertaining multiple pathways in the code of the at least one module; and
forming the groups of code to correspond to the ascertained pathways.

16. The system of claim 10, wherein the verifier tool is configured to verify on a per group basis for each of the groups of code by:

executing one or more callbacks corresponding to a group of code;

monitoring to determine compliance of the callbacks with the rule; and outputting a verification result for the group of code with respect to the rule.

17. The system of claim 10, wherein the verifier tool is configured to derive different groups of code for each of said multiple rules against which the code of the at least one module is verified.

18. The method of claim 1, further comprising:

constructing an environment model that is representative of an environment in which the code operates; and employing the environment model to verify the code against the one or more rules.

19. The system of claim 11, wherein the verifier tool is configured to construct the environment model of the operating system, the environment model representative of an environment in which the code of the at least one module operates.

20. The system of claim 16, wherein:

callbacks occurring before the non-deterministic portion are designated as "Pre" and relate to initialization operations of the code of the at least one module;

callbacks occurring in the non-deterministic portion are designated as "Core" and relate to core functionality of the code of the at least one module; and callbacks occurring after the non-deterministic portion are designated as "Post" and relate to clean-up operations of the code of the at least one module.

* * * * *